(12) United States Patent
Hibi et al.

(10) Patent No.: US 9,046,429 B2
(45) Date of Patent: Jun. 2, 2015

(54) TORQUE SENSOR (71) Applicant: JTEKT CORPORATION, Osaka-shi, Osaka (JP)

(72) Inventors: Toshie Hibi, Okazaki (JP); Osamu Takahashi, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 59 days.

(21) Appl. No.: 13/906,840

(22) Filed: May 31, 2013

(65) Prior Publication Data
US 2013/0327158 A1 Dec. 12, 2013

(30) Foreign Application Priority Data
Jun. 7, 2012 (JP) ................................. 2012-129988

(51) Int. Cl.
*G01L 3/02* (2006.01)
*G01L 3/04* (2006.01)
*G01L 3/10* (2006.01)

(52) U.S. Cl.
CPC . *G01L 3/04* (2013.01); *G01L 3/101* (2013.01); *G01L 3/109* (2013.01)

(58) Field of Classification Search
CPC ............ G01I 3/00; G01L 3/109; G01L 3/101; G01L 3/04; G01D 2/2086
USPC ........................ 73/862.191, 862.331–862.335
See application file for complete search history.

(56) References Cited

U.S. PATENT DOCUMENTS

| | | | | |
|---|---|---|---|---|
| 6,901,816 B2* | 6/2005 | Yamaguchi | ............... | 73/862.326 |
| 6,957,713 B2* | 10/2005 | Tomita | .......... | 180/446 |
| 7,076,352 B2* | 7/2006 | Kohno et al. | ............ | 318/400.15 |
| 7,076,395 B2* | 7/2006 | Ito | ................. | 702/151 |
| 7,107,862 B2* | 9/2006 | Onoda et al. | ............. | 73/862.331 |
| 7,775,129 B2* | 8/2010 | Oike et al. | ................. | 73/862.46 |
| 8,656,791 B2* | 2/2014 | Aoki | ......................... | 73/862.331 |
| 2007/0246290 A1 | 10/2007 | Deshmukh et al. | | |
| 2010/0277017 A1 | 11/2010 | Alexander et al. | | |
| 2012/0261209 A1* | 10/2012 | Shiino | ........................... | 180/446 |

FOREIGN PATENT DOCUMENTS

| | | |
|---|---|---|
| EP | 1 504 982 A2 | 2/2005 |
| JP | A-2008-058026 | 3/2008 |
| JP | 2011-234545 A | 11/2011 |

OTHER PUBLICATIONS

Mar. 12, 2015 extended European search report issued in European Application No. 13170593.1.

* cited by examiner

*Primary Examiner* — Max Noori
(74) *Attorney, Agent, or Firm* — Oliff PLC (57) ABSTRACT

A torque sensor includes a first resolver that outputs a signal corresponding to a rotation angle of a first rotor fitted on an outer periphery of a first rotary shaft, and a second resolver that outputs a signal corresponding to a rotation angle of a second rotor fitted on an outer periphery of a second rotary shaft coupled to the first rotary shaft via a torsion bar. The torque sensor detects a torque exerted on the first rotary shaft or the second rotary shaft based on the signals output from the first resolver and the second resolver. A first junction between the first rotary shaft and the first rotor, and a second junction between the second rotary shaft and the second rotor are formed so as to have different shapes or different sizes.

7 Claims, 7 Drawing Sheets

TORQUE SENSOR

INCORPORATION BY REFERENCE/RELATED APPLICATION

The application claims priority to Japanese Patent Application No. 2012-129988 filed on Jun. 7, 2012 the disclosure of which, including the specification, drawings and abstract, is incorporated herein by reference in its entirety.

BACKGROUND OF THE INVENTION

1. Field of the Invention

The invention relates to a torque sensor that detects a torque exerted on a rotary shaft.

2. Description of Related Art

This kind of conventional torque sensor is described in Japanese Patent Application Publication No. 2008-58026 (JP 2008-58026 A). The torque sensor described in JP 2008-58026 A is configured as a so-called twin resolver-type torque sensor, and includes a first resolver that detects a rotation angle of a first rotary shaft and a second resolver that detects a rotation angle of a second rotary shaft. The first rotary shaft and the second rotary shaft are coupled to each other via a torsion bar.

The first resolver includes a rotor fitted on the outer periphery of the first rotary shaft, and a stator that surrounds the outer periphery of the rotor. The stator is provided with multi-phase output coils. Upon reception of excitation signals, multi-phase signals that vary in accordance with the rotation angle (electric angle) of the rotor are output from the multi-phase output coils of the first resolver. Therefore, the rotation angle (electric angle) of the first rotary shaft is computed based on the multi-phase signals output from the first resolver.

The second resolver has the same configuration as that of the first resolver, except that the shaft angle multiplier is different from that of the first resolver. Note that the shaft angle multiplier indicates a multiplying factor of a voltage signal output from each output coil, in other words, a multiplying factor used to obtain an electrical angle of the rotor from a mechanical angle of the rotor. The rotation angle (electric angle) of the second rotary shaft is computed on the basis of the multi-phase signals output from the second resolver.

In the torque sensor described in JP 2008-58026 A, a rotation angle of the first rotary shaft and a rotation angle of the second rotary shaft are computed by output signals from the respective two resolvers, and then a torsion amount of the torsion bar is obtained by computing a value of the difference between the rotation angles. Finally, a torque exerted on the rotary shaft is computed from the torsion amount.

When the shaft angle multipliers of the two resolvers are different from each other as in the torque sensor described in JP 2008-58026 A, it is necessary, during assembly of the torque sensor onto the rotary shaft, to mount the first resolver onto the first rotary shaft and to mount the second resolver onto the second rotary shaft. However, if a worker erroneously mounts the rotor of the first resolver onto the second rotary shaft and the rotor of the second resolver onto the first rotary shaft, appropriate signals are not output from the two resolvers. As a result, the rotation angles of the two rotary shafts are not appropriately detected, which creates a possibility that a torque will not be accurately detected.

SUMMARY OF THE INVENTION

The invention provides a torque sensor configured to make it possible to appropriately mount rotors of two resolvers onto corresponding rotary shafts.

According to a feature of an example of the invention, there is provided a torque sensor including a first resolver that outputs a signal corresponding to a rotation angle of a first rotor fitted on an outer periphery of a first rotary shaft, and a second resolver that outputs a signal corresponding to a rotation angle of a second rotor fitted on an outer periphery of a second rotary shaft that is coupled to the first rotary shaft via a torsion bar, the torque sensor detecting a torque exerted on the first rotary shaft or the second rotary shaft based on the signals output from the first resolver and the second resolver, wherein a first junction between the first rotary shaft and the first rotor and a second junction between the second rotary shaft and the second rotor are formed so as to have different shapes or different sizes.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
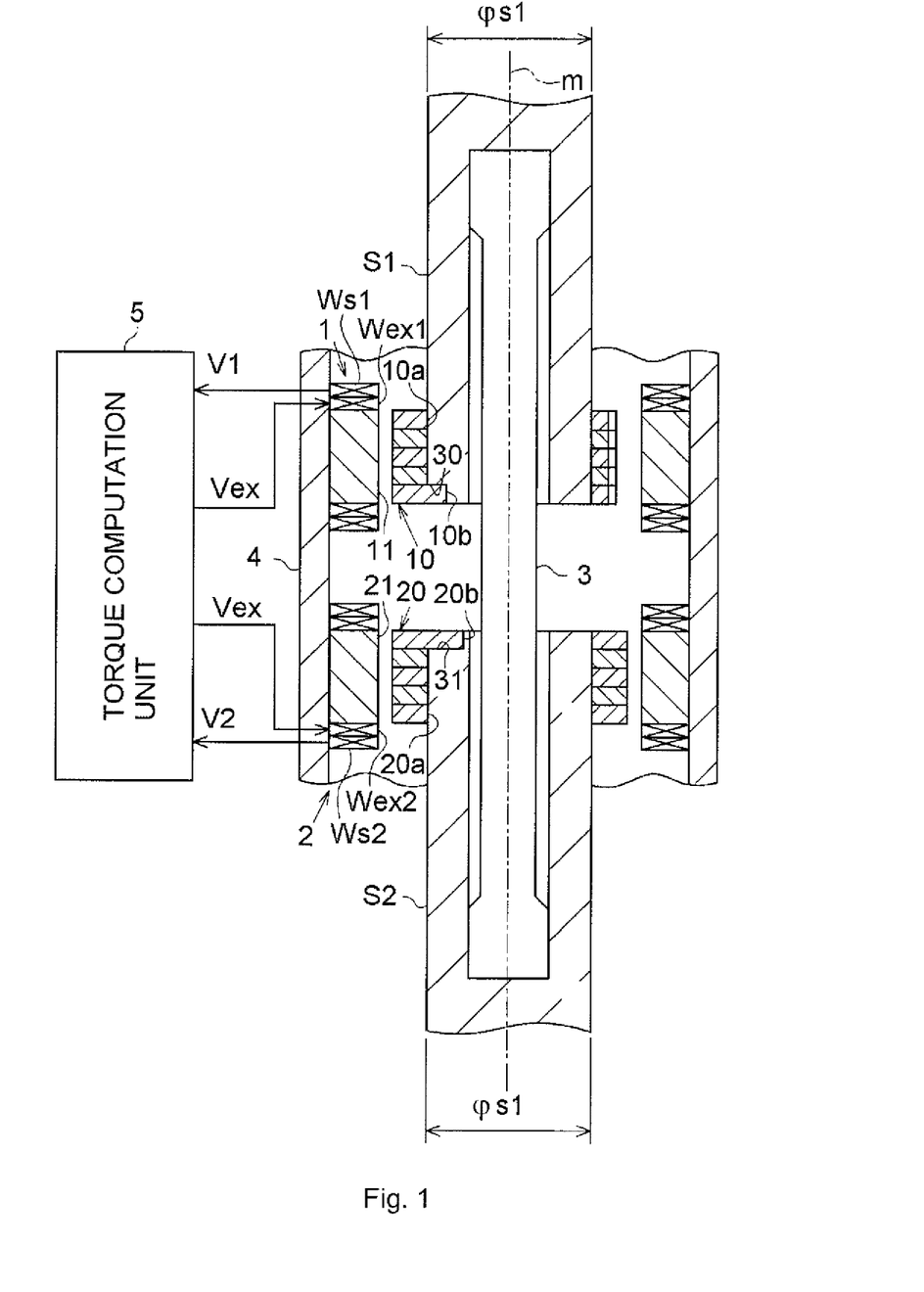
FIG. 1 is a sectional view illustrating the structure of a torque sensor according to a first embodiment of the invention.

Hereinafter, a torque sensor according to a first embodiment of the invention will be described with reference to FIG. 1 to FIG. 6. As shown in FIG. 1, the torque sensor includes a first resolver 1 that detects a rotation angle of a first rotary shaft S1, and a second resolver 2 that detects a rotation angle of a second rotary shaft S2. The first rotary shaft S1 and the second rotary shaft S2 have the same outer diameter φs1, and are coupled to each other via a torsion bar 3 on the same axis m. The first resolver 1 and the second resolver 2 are covered by a housing 4 so as to be protected from the external environments.

The first resolver 1 is a so-called variable reluctance (VR) resolver, and includes a first rotor 10 fitted onto the outer peripheral face of the first rotary shaft S1, and a first stator 11 arranged so as to surround the outer periphery of the first rotor 10.

Figure 2A:
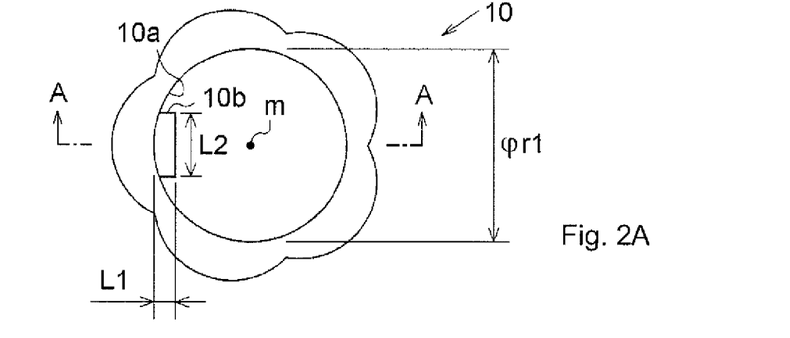
FIG. 2A is a plan view illustrating the structure of a first rotor of the torque sensor according to the first embodiment.
Figure 2B:
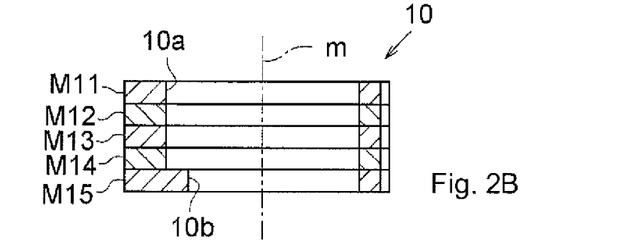
FIG. 2B is a sectional view taken along the line A-A in FIG. 2A.

As shown in FIG. 2A, the first rotor 10 has five salient pole portions formed on its outer periphery. Accordingly, the shaft angle multiplier of the first resolver 1 is set to 5X. A through-hole 10a, which has an inner diameter φr1 that is slightly larger than the outer diameter φs1 of the first rotary shaft S1, is formed in a center portion of the first rotor 10. A portion of the first rotor 10, which defines the through-hole 10a, is fitted to the outer peripheral face of the first rotary shaft S1. As shown in FIG. 2B, the first rotor 10 is formed of five magnetic steel sheets M11 to M15, each of which has the through-hole 10a and the five salient pole portions and which are stacked together in the axial direction so as to be angularly shifted from each other. Thus, an imbalance of the magnetic property of the first rotor 10 is suppressed, and accordingly, the first resolver 1 is able to detect a rotation angle with a higher degree of accuracy. Only the magnetic steel sheet M15, which is the lowermost magnetic steel sheet among the magnetic steel sheets M11 to M15, has a rectangular protrusion 10b formed on its inner peripheral face. As shown in FIG. 2A, the amount by which the protrusion 10b protrudes from the inner peripheral face is set to L1 and the width of the protrusion 10b is set to L2.

Figure 3A:
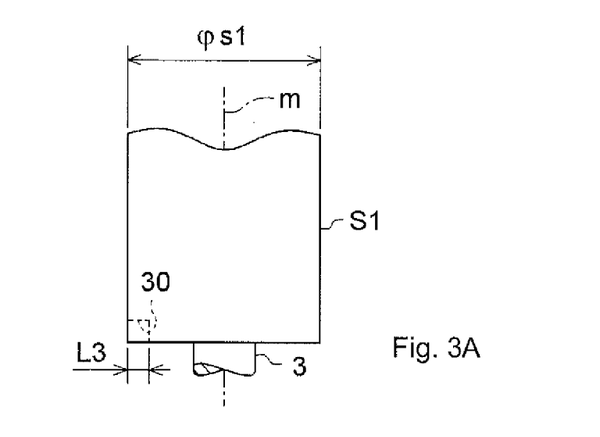
FIG. 3A is a front view illustrating the structure of a first rotary shaft in the torque sensor according to the first embodiment.
Figure 3B:
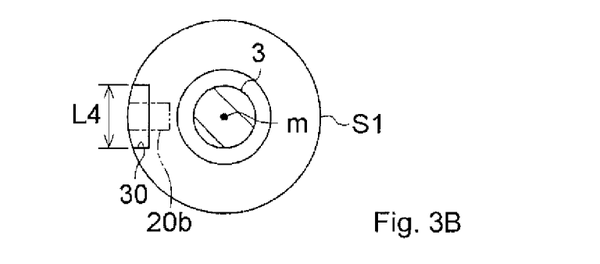
FIG. 3B is a bottom view illustrating the structure of the first rotary shaft.

As shown in FIG. 3A and FIG. 3B, a recessed portion 30 is formed in the outer peripheral face of the first rotary shaft S1 so as to extend in the axial direction from the lower end face of the first rotary shaft S1. The recessed portion 30 is formed to be slightly smaller than the protrusion 10b of the first rotor 10. That is, the recessed portion 30 has a depth L3 which is set to be slightly smaller than the protrusion amount L1 of the protrusion 10b, and a width L4 which is set to be slightly smaller than the width L2 of the protrusion 10b.

As shown in FIG. 1, in the first resolver 1, the first rotary shaft S1 is fitted in the through-hole 10a of the first rotor 10. With the first fitting structure, the first rotor 10 is mounted on the first rotary shaft S1. When the first rotor 10 is fitted onto the first rotary shaft S1, the protrusion 10b of the first rotor 10 is engaged in the recessed portion 30 of the first rotary shaft S1, and then the recessed portion 30 and the protrusion 10b are caulked together. With the engagement structure formed of the recessed portion 30 and the protrusion 10b, the rotation of the first rotor 10 relative to the first rotary shaft S1 is restricted, and accordingly, a rotation angle detected by the first resolver 1 is hardly deviated from an actual rotation angle of the first rotary shaft S1. Thus, the degree of accuracy with which the first resolver 1 detects a rotation angle is enhanced.

Further, the first stator 11 is fixed to the housing 4. Exciting coils Wex1 and multi-phase output coils Ws1 are wound on the first stator 11. In the first resolver 1, when an AC voltage excitation signal Vex is input into each of the exciting coils Wex1, alternating magnetic fields are produced by the exciting coils Wex1. The alternating fields are applied to the multi-phase output coils Ws1 through magnetic paths defined between the first rotor 10 and the first stator 11. A voltage is induced under electromagnetic induction in the multi-phase output coils Ws1, and accordingly, a voltage signal V1 is output from each of the multi-phase output coils Ws1. Further, as the first rotor 10 rotates, the positions of the salient pole portions of the first rotor 10 change, and accordingly, the gaps (clearances) between the first rotor 10 and the first stator 11 are periodically changed. Thus, the signal V1 output from each of the multi-phase coils Ws1 is changed in accordance with the rotation angle (electric angle) of the first rotor 10. The multi-phase signals V1 output from the first resolver 1 are input into a torque computation unit 5.

Figure 4A:
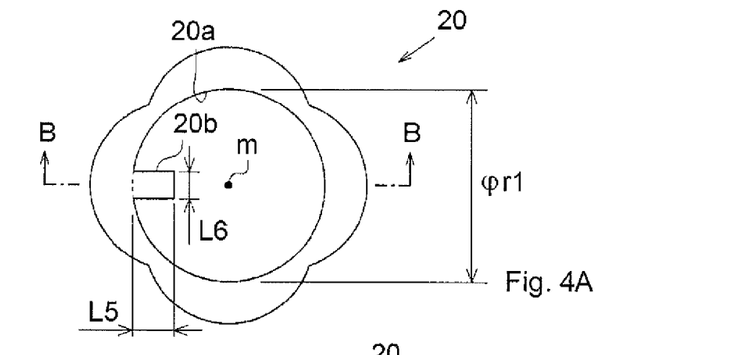
FIG. 4A is a plan view illustrating the structure of a second rotor of the torque sensor according to the first embodiment.
Figure 4B:
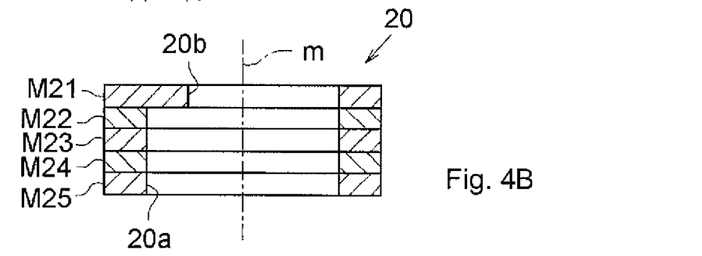
FIG. 4B is a sectional view taken along the line B-B in FIG. 4A.

The second resolver 2 is also a so-called VR resolver, and includes a second rotor 20 fitted on the outer peripheral face of the second rotary shaft S2, and a second stator 21 arranged so as to surround the outer periphery of the second rotor 20, As shown in FIG. 4A, the second rotor 20 has four salient pole portions formed on its outer periphery. That is, the shaft angle multiplier of the second resolver 2 is set to 4X. A through-hole 20a, which has an inner diameter φr1 that is slightly larger than an outer diameter φs1 of the second rotary shaft S2, is formed in a center portion of the second rotor 20. A portion of the second rotor 20, which defines the through-hole 20a, is fitted to the outer peripheral face of the second rotary shaft S2. As shown in FIG. 4B, the second rotor 20 is formed of five magnetic steel sheets M21 to M25, each of which has the through-hole 20a and the four salient pole portions and which are stacked together in the axial direction so as to be angularly shifted from each other. Thus, an imbalance of the magnetic property of the second rotor 20 is suppressed, and accordingly, the second resolver 2 is able to detect a rotation angle with a higher degree of accuracy. As shown in FIG. 4B, only the magnetic steel sheet M21, which is the uppermost magnetic steel sheet among the magnetic steel sheets M21 to M25, has a rectangular protrusion 20b formed on its inner peripheral face. As shown in FIG. 4A, the amount by which the protrusion 20b protrudes from the inner peripheral face is set to L5 which is larger than the protrusion amount L1 of the protrusion 10b shown in FIG. 2A, and the width of the protrusion 20b is set to L6 which is smaller than the width L2 of the protrusion 10b shown in FIG. 2A.

Figure 5A:
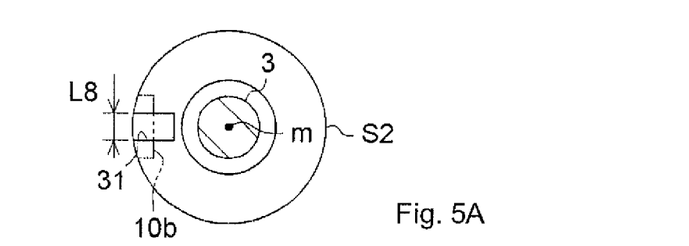
FIG. 5A is a plan view illustrating the structure of a second rotary shaft in the torque sensor according to the first embodiment.
Figure 5B:
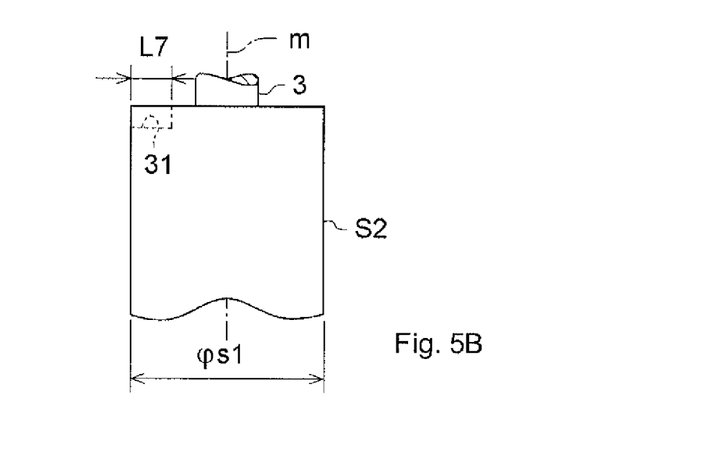
FIG. 5B is a front view illustrating the structure of the second rotary shaft.

As shown in FIG. 5A and FIG. 5B, a recessed portion 31 is formed in the outer peripheral face of the second rotary shaft S2 so as to extend in the axial direction from the upper end face of the second rotary shaft S2. The recessed portion 31 is formed so as to be slightly smaller than the protrusion 20b of the second rotor 20. That is, the recessed portion 31 has a depth L7 which is set to be slightly smaller the protrusion amount L5 of the protrusion 20b, and a width L8 which is set to be slightly smaller than the width L6 of the protrusion 20b.

Further, as shown in FIG. 1, in the second resolver 2, the second rotary shaft S2 is fitted in the through-hole 20a of the second rotor 20. With the second fitting structure, the second rotor 20 is mounted on the second rotary shaft S2. Further, when the second rotor 20 is fitted onto the second rotary shaft S2, the protrusion 20b of the second rotor 20 is engaged in the recessed portion 31 of the second rotary shaft S2, and then recessed portion 31 and the protrusion 20b are caulked together. With this engagement structure formed of the recessed portion 31 and the protrusion 20b, the rotation of the second rotor 20 relative to the second rotary shaft S2 is restricted, and accordingly, a rotation angle detected by the second resolver 2 is hardly deviated from an actual rotation angle of the second rotary shaft S2. Thus, the rotation angle of the second resolver is detected with a higher degree of accuracy.

The second stator 21 is fixed to the housing 4. Exciting coils Wex2 and multi-phase output coils Ws2 are wound on the second stator 21. Note that the operation of the second resolver 2 is basically the same as the operation of the first resolver, and accordingly, detailed explanation of the second resolver 2 will be omitted. Multi-phase signals V2 output from the second resolver 2 are input into the torque computation unit 5.

The torque computation unit 5 outputs the excitation signals Vex to the first resolver 1, and at the same time, computes a rotation angle of the first rotor 10, namely, a rotation angle (electric angle) of the first rotary shaft S1, on the basis of the multi-phase signals V1 received from the first resolver 1. Further, the torque computation unit 5 outputs the excitation signals Vex to the second resolver 2, and at the same time, computes a rotation angle of the second rotor 20, namely, a rotation angle (electric angle) of the second rotary shaft S2, on the basis of multi-phase signals V2 received from the second resolver 2. The torque computation unit 5 computes a value of the difference between the rotation angle of the first rotary shaft S1 and the rotation angle of the second rotary shaft S2, which are computed as stated above, to obtain a torsion amount of the torsion bar. Then, the thus obtained torsion amount is multiplied by a spring constant of the torsion bar to compute a torque exerted on the first rotary shaft S1 or the second rotary shaft S2.

Next, the operation of the torque sensor according to the present embodiment will be described. The case where a worker erroneously attempts to mount the second rotor 20 onto the first rotary shaft S1 will be described. In this case, as shown in FIG. 3B, because the shape of the recessed portion 30 of the first rotary shaft S1 differs from the shape of the protrusion 20b of the second rotor 20 indicated by a tow-dot chain line in the drawing, the worker cannot engage the protrusion 20b in the recessed portion 30. Thus, the worker can notice that he/she erroneously attempts to mount the second rotor 20 onto the first rotary shaft S1.

Next, the case where the worker erroneously attempts to mount the first rotor 10 onto the second rotary shaft S2 will be described. In this case, as shown in FIG. 5A, because the shape of the recessed portion 31 of the second rotary shaft S2 differs from the shape of the protrusion 10b of the first rotor 10 indicated by a tow-dot-chain line in the drawing, the worker cannot engage the protrusion 10b in the recessed portion 31. Thus, the worker can notice that he/she erroneously attempts to mount the first rotor 10 onto the second rotary shaft S2.

According to the present embodiment, the worker can notice the erroneous mounting of the two rotors 10, 20, and accordingly, the worker can appropriately mount the two rotors 10, 20 onto the corresponding rotary shafts S1, S2, respectively.

Figure 6:
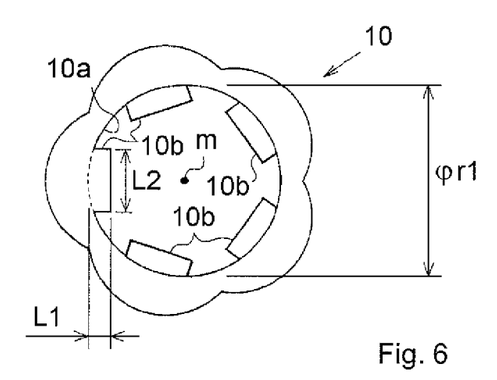
FIG. 6 is a plan view illustrating the structure of a first rotor of the torque sensor according to a modified example of the first embodiment.

Further, in the case where the protrusion 10b shown in FIG. 2A and FIG. 2B is formed in each of all the magnetic steel sheets M11 to M15, when the magnetic steel sheets M11 to M15 are stacked together so as to be angularly shifted from each other, the protrusions 10b are arranged on the inner peripheral face of the first rotor 10 at five positions in the circumferential direction, as shown in FIG. 6. If the first rotor 10 has such a configuration, it is necessary to form the recessed portions 30 in the outer peripheral face of the first rotary shaft S1 at five positions corresponding to the protrusions 10b. Therefore, the number of man-hours needed to manufacture the first rotary shaft S1 may increase. However, when the protrusion 10b is formed only in the magnetic steel sheet 15 as shown in FIG. 2A and FIG. 2B, even if the magnetic steel sheets M11 to M15 are stacked together so as to be angularly shifted from each other, only one protrusion 10b is formed in the first rotor 10 at a portion to which the first rotary shaft S1 is fitted. Thus, it is necessary to form only one recessed portion 30 in the first rotary shaft S1 at the portion to which the first rotor 10 is fitted. Therefore, the number of man-hours needed to manufacture the first rotary shaft S1 is decreased. Similarly, the number of man-hours needed to manufacture the second rotary shaft S2 is decreased.

As described above, the torque sensor according to the present embodiment produces the following advantageous effects.

(1) The first protrusion and recess engagement structure is provided at the first junction between the first rotary shaft S1 and the first rotor 10. Further, the second protrusion and recess engagement structure is provided at the second junction between the second rotary shaft S2 and the second rotor 20. Further, the first protrusion and recess engagement structure and the second protrusion and recess engagement structure are formed so as to be different from each other in configuration. Thus, the worker can notice erroneous mounting of the two rotors 10, 20, and accordingly, the rotors 10, 20 are appropriately mounted onto the corresponding rotary shafts S1, S2, respectively. Further, because the rotation of the first rotor 10 relative to the first rotary shaft S1, and the rotation of the second rotor 20 relative to the second rotary shaft S2 are restricted, the two resolvers 1, 2 are able to detect rotation angles with a higher degree of accuracy.

(2) The first rotor 10 is formed of the five magnetic steel sheets M11 to M15 that are stacked together so as to be angularly shifted from each other. Further, among them, only the magnetic steel sheet M15 has the protrusion 10b. Similarly, the second rotor 20 is formed of the five magnetic steel plates M21 to M25 that are stacked together so as to be angularly shifted from each other. Further, among them, only the magnetic steel sheet M21 has the protrusion 20b. Thus, it is necessary to form the recessed portions 30, 31, which correspond to the protrusions 10b, 20b, in the two rotary shafts S1, S2, respectively, that is, it is necessary to form only one recess in each rotary shaft. Therefore, it is possible to reduce the number man-hours needed to manufacture the two rotary shafts S1, S2.

(3) The magnetic steel sheet M15 having the protrusion 10b is arranged at one end of the first rotor 10. Further, the magnetic steel sheet M21 having the protrusion 20b is arranged at one end of the second rotor 20. With this configuration, the manufacture of the first rotor 10 is completed by stacking the magnetic steel sheets M11 to M14 together such that the magnetic steel sheets M11 to M14 are angularly shifted from each other, and then arranging the magnetic steel sheet M15 at one end of the magnetic steel plate stack. Further, the second rotor 20 is manufactured in a similar way. Therefore, it is possible to easily manufacture the two rotors 10, 20.

Next, a torque sensor according to a second embodiment of the invention will be described with reference to FIG. 7A to FIG. 10B. Mainly, the difference from the first embodiment will be described below.

Figure 7A:
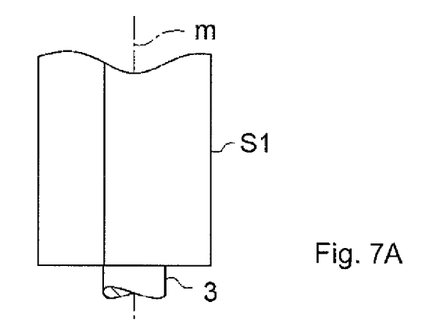
FIG. 7A is a front view illustrating the structure of a first rotary shaft in a torque sensor according to a second embodiment of the invention.
Figure 7B:
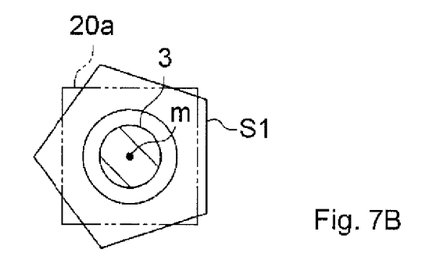
FIG. 7B is a bottom view illustrating the structure of the first rotary shaft according to a second embodiment of the invention.
Figure 8A:
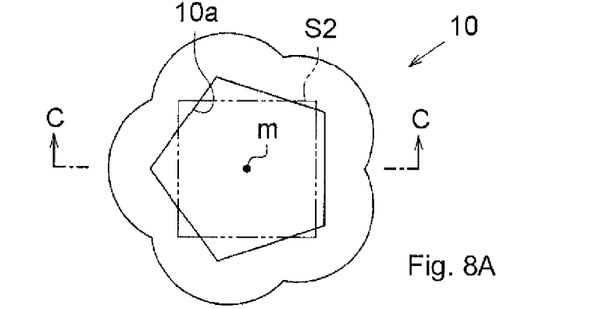
FIG. 8A is a plan view illustrating the structure of a first rotor of the torque sensor according to the second embodiment.
Figure 8B:
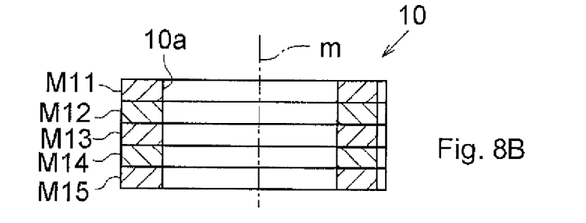
FIG. 8B is a sectional view taken along the line C-C in FIG. 8A.

In the present embodiment, as shown in FIG. 7A and FIG. 7B, the outer periphery of a lower end portion of the first rotary shaft S1 is formed in a pentagonal shape. Further, as shown in FIG. 8A and FIG. 8B, a pentagonal through-hole 10a, which is slightly larger than the outer periphery of the first rotary shaft S1, is formed in the center portion of the first rotor 10. A portion of the first rotor 10, which defines the through-hole 10a, is fitted to the first rotary shaft S1. By fitting the first rotary shaft S1 into the through-hole 10a, the first rotor 10 is mounted on the first rotary shaft S1. With this configuration, because the first rotary shaft S1 and the first rotor 10 are engaged with each other in the rotational direction, the rotation of the first rotor 10 relative to the first rotary shaft S1 is restricted without provision of the protrusion and recess engagement structure described in the first embodiment.

Figure 9A:
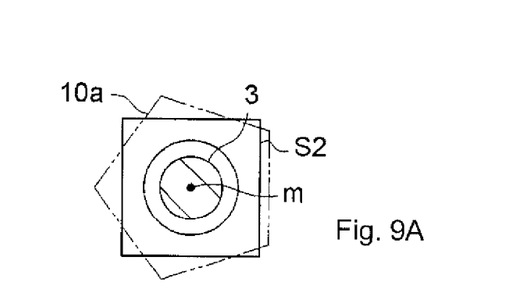
FIG. 9A is a plan view illustrating the structure of a second rotary shaft in the torque sensor in the second embodiment.
Figure 9B:
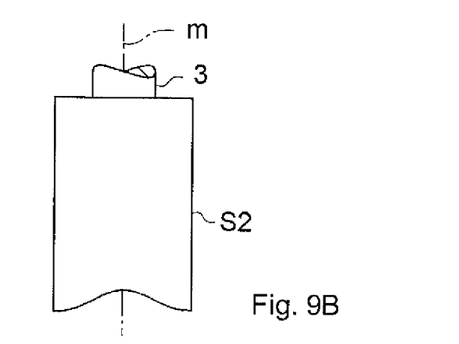
FIG. 9B is a front view illustrating the structure of the second rotary shaft according to the second embodiment.
Figure 10A:
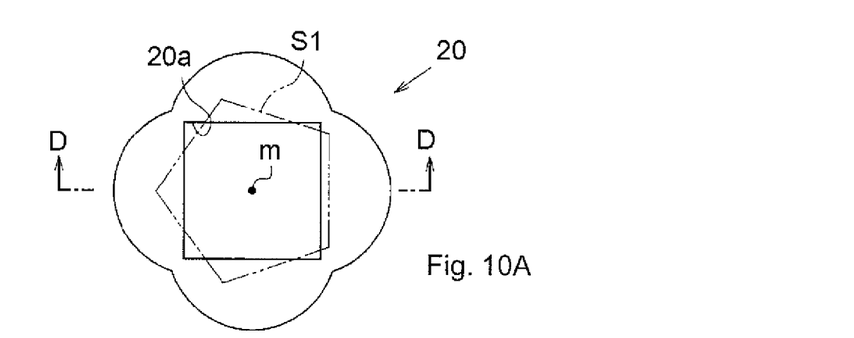
FIG. 10A is a plan view illustrating the structure of a second rotor of the torque sensor according to the second embodiment.
Figure 10B:
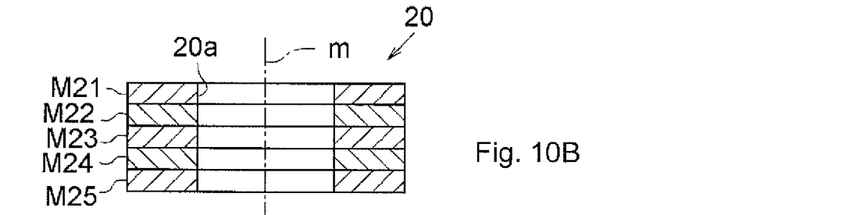
FIG. 10B is a sectional view taken along the line D-D in FIG. 10A.

On the other hand, as shown in FIG. 9A and FIG. 9B, the outer periphery of an upper end portion of the second rotary shaft S2 is faulted in a quadrilateral shape. Further, as shown in FIG. 10A and FIG. 10B, a quadrilateral through-hole 20a, which is slightly larger than the outer periphery of the second rotary shaft S2, is formed in the center portion of the second rotor 20. A portion of the second rotor 20, which defines the through-hole 20a, is fitted to the second rotary shaft S2. By fitting the second rotary shaft S2 into the through-hole 20a, the second rotor 20 is mounted on the second rotary shaft S2. With this configuration, the second rotary shaft S2 and the second rotor 20 are engaged with each other in the rotational direction, and accordingly, the rotation of the second rotor 20 relative to the second rotary shaft S2 is restricted without provision of the protrusion and recess engagement structure described in the first embodiment.

The through-hole 10a of the first rotor 10 has such a size and shape that the second rotary shaft S2 cannot be inserted into the through-hole 10a as indicated by a two-dot-chain line in FIG. 8A. Further, the through-hole 20a of the second rotor 20 has such a size and shape that the first rotary shaft S1 cannot be inserted into the through-hole 20a as indicated by a two-dot chain line in FIG. 10A.

Next, the operation of the torque sensor according to the present embodiment will be described. The case where a worker erroneously attempts to mount the second rotor 20 onto the first rotary shaft S1 will be described. In this case, as shown in FIG. 7B, because the shape of the outer periphery of the first rotary shaft S1 is different from the shape of the through-hole 20a of the second rotor 20 as indicated by a two-dot chain line in the drawing, the worker cannot insert the first rotary shaft S1 into the through-hole 20a. Thus, the worker can notice that he/she erroneously attempts to mount the second rotor 20 onto the first rotary shaft S1.

Next, the case where the worker erroneously attempts to mount the first rotor 10 onto the second rotary shaft S2 will be described. In this case, as shown in FIG. 9A, because the shape of the outer periphery of the second rotary shaft S2 is different from the shape of the through-hole 10a of the first rotor 10 as indicated by a two-dot chain line in the drawing, the worker cannot insert the second rotary shaft S2 into the through-hole 10a. Thus, the worker can notice that he/she erroneously attempts to mount the first rotor 10 onto the second rotary shaft S2.

In the present embodiment, the outer periphery of the first rotary shaft S1 has corners the number of which corresponds to the value of the shaft angle multiplier of the first resolver 1, and the outer periphery of the second rotary shaft S2 has corners the number of which corresponds to the value of the shaft angle multiplier of the second resolver 2. Thus, only by checking the number of corners of each of the rotary shafts S1, S2, the worker can easily recognize which of the two kinds of rotors should be fitted. Thus, it is possible to more reliably avoid erroneous mounting of rotors.

According to the present embodiment as well as according to the first embodiment, the worker can notice erroneous mounting of the two rotors 10, 20, and accordingly, the worker can appropriately mount the two rotors 10, 20 onto the corresponding rotary shafts S1, S2, respectively.

As described above, the torque sensor according to the present embodiment produces the following advantageous effect.

(4) The first junction between the first rotary shaft S1 and the first rotor 10 is formed in a pentagonal shape. Further, the second junction between the second rotary shaft S2 and the second rotor 20 is formed in a quadrilateral shape. With this configuration, the worker can notice erroneous mounting of the two rotors 10, 20. Therefore, the worker can appropriately mount the two rotors 10, 20 onto the corresponding rotary shafts S1, S2, respectively. Further, the rotation of the first rotor 10 relative to the first rotary shaft S1 and the rotation of the second rotor 20 relative to the second shaft S2 are restricted without provision of the protrusion and recess engagement structure. Thus, it is possible to simplify the configuration of the torque sensor by eliminating the need for the protrusion and recess engagement structure, while maintaining the degree of accuracy of rotation angle detection by the two resolvers. Further, only by checking the number of corners of the outer periphery of each of the rotary shafts S1, S2, the worker can easily recognize which of the two kinds of rotors 10, 20 should be fitted. Thus, it is possible to more reliably avoid erroneous mounting of rotors.

Next, a torque sensor according to a third embodiment of the invention will be described with reference to FIG. 11A to FIG. 13. Mainly, the difference from the first embodiment will be described below.

In the present embodiment, the first rotary shaft S1 has an outer diameter which is set to $\phi$s1 as in the first embodiment, but the second rotary shaft S2 has an outer diameter which is set to $\phi$s2 unlike in the first embodiment in which the outer diameter of the second rotary shaft S2 is set to $\phi$s1.

Figure 11A:
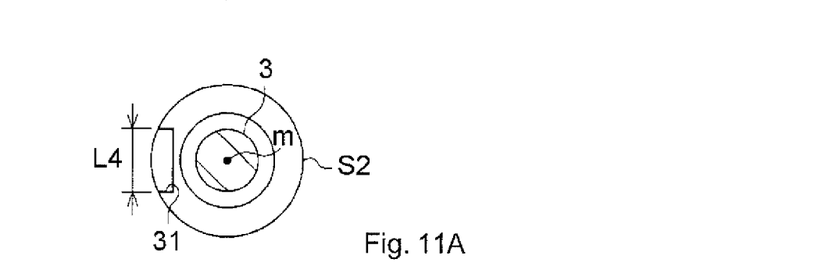
FIG. 11A is a plan view illustrating the structure of a second rotary shaft in a torque sensor according to a third embodiment of the invention.
Figure 11B:
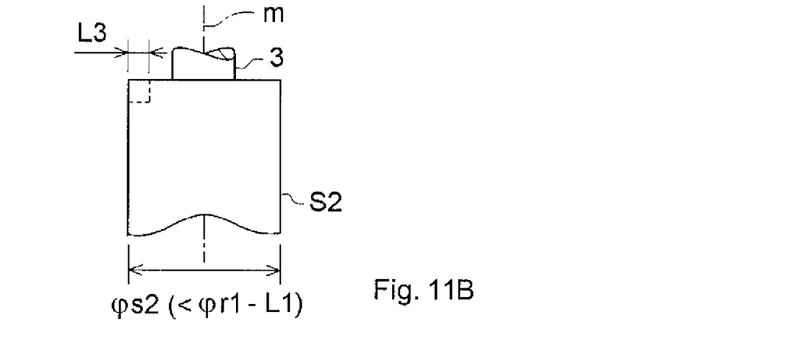
FIG. 11B is a front view illustrating the structure of the second rotary shaft according to a third embodiment of the invention.

More specifically, as shown in FIG. 2A, in the case where the inner diameter of the first rotor 10 is set to $\phi$r1 and the protrusion amount of the protrusion 10b is set to L1, the outer diameter $\phi$s2 of the second rotary shaft S2 is set so as to satisfy the following relationship, $\phi$s2<$\phi$r1−L1, as shown in FIG. 11B.

Figure 12A:
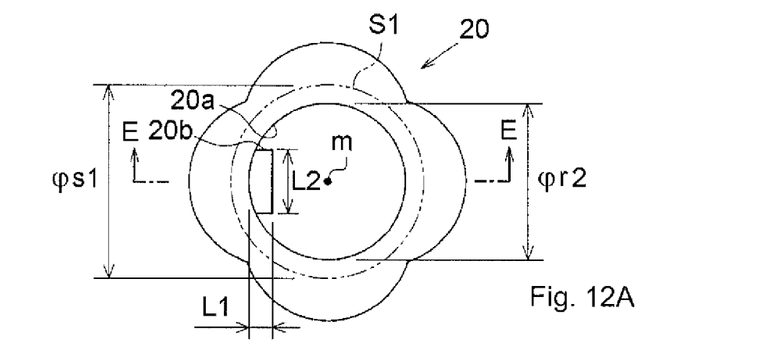
FIG. 12A is a plan view illustrating the structure of a second rotor of the torque sensor in the third embodiment.
Figure 12B:
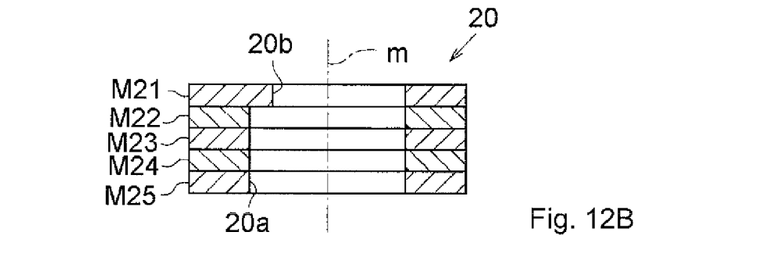
FIG. 12B is a sectional view taken along the line E-E in FIG. 12A.
Figure 13:
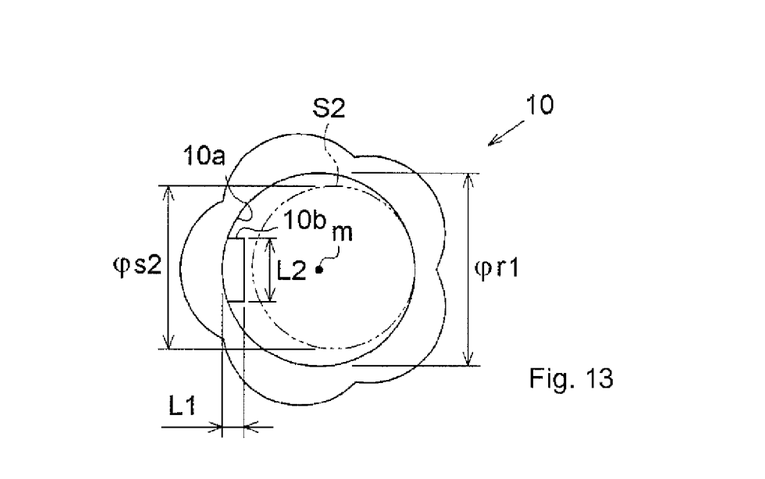
FIG. 13 is a plan view illustrating the structure of a first rotor of the torque sensor in the third embodiment.

As shown in FIG. 12A and FIG. 12B, the inner diameter $\phi$r2 of the through-hole 20a formed in the center portion of the second rotor 20 is set to be slightly larger than the outer diameter $\phi$s2 of the second rotary shaft S2 so that the second rotor 20 is allowed to be fitted onto the outer peripheral face of the second rotary shaft S2. Further, as indicated by a two-dot-chain line in FIG. 12A, the inner diameter $\phi$r2 of the second rotor 20 is set to be smaller than the outer diameter $\phi$s1 of the first rotary shaft S1. Further, as shown in FIG. 12B, the protrusion 20b formed on the inner peripheral face of the magnetic steel sheet M21 has the same shape as that of the protrusion 10b formed in the first rotor 10. That is, the protrusion amount of the protrusion 20b is set to L1, and the width of the protrusion 20b is set to L2.

Further, as shown in FIG. 11A and FIG. 11B, the recessed portion 31 formed in the outer peripheral face of the second rotary shaft S2 has the same shape as that of the recessed portion 30 formed in the first rotary shaft S1. That is, the depth of the recessed portion 31 is set to L3, and the width of the recessed portion 31 is set to L4.

Next, the operation of the torque sensor according to the present embodiment will be described. The case where a worker erroneously attempts to mount the second rotor 20 onto the first rotary shaft S1 will be described. In this case, as indicated by a two-dot-chain line in FIG. 12A, because the outer diameter φs1 of the first rotary shaft S1 is larger than the inner diameter φr2 of the second rotor 20, the worker cannot insert the first rotary shaft S1 into the through-hole 20a of the second rotor 20. Thus, the worker can notice that he/she erroneously attempts to mount the second rotor 20 onto the first rotary shaft S1.

Next, the case where the worker erroneously attempts to mount the first rotor 10 onto the second rotary shaft S2 will be described. In this case, as indicated by a two-dot-chain line in FIG. 13, although the worker can insert the second rotary shaft S2 into the first rotor 10, the worker cannot fit the first rotor 10 and the second rotary shaft S2 together because the sizes of the first rotor 10 and the second rotary shaft S2 are set such that they cannot be fitted together. Thus, the worker can notice that he/she erroneously attempts to mount the first rotor 10 onto the second rotary shaft S2.

Thus, according to the present embodiment as well as according to the first embodiment, the worker can notice erroneous mounting of the two rotors 10, 20, and accordingly, the worker can appropriately mount the two rotors 10, 20 onto the corresponding rotary shafts S1, S2, respectively.

As described above, the torque sensor according to the present embodiment produces the following advantageous effect.

(5) The outer diameter φs1 of the first rotary shaft S1 is set to be larger than the inner diameter φr2 of the second rotor 20. Further, in the case where the inner diameter of the first rotor 10 is set to φr1 and the protrusion amount of the protrusion 10b of the first rotor 10 is set to L1, the outer diameter φs2 of the second rotary shaft S2 is set so as to satisfy the following relationship, φs2<φr1−L1. Thus, the worker can notice erroneous mounting of the two rotors 10, 20, and accordingly, the worker can appropriately mount the two rotors 10, 20 onto the corresponding rotary shafts S1, S2, respectively.

Note that the above-described embodiments may be modified as follows.

In the first embodiment, the configuration of the first protrusion and recess engagement structure formed of the protrusion 10b of the first rotor 10 and the recessed portion 30 of the first rotary shaft S1 may be modified as needed. Further, the configuration of the second protrusion and recess engagement structure formed of the protrusion 20b of the second rotor 20 and the recessed portion 31 of the second rotary shaft S2 may be modified as needed. That is, it is necessary that the first protrusion and recess engagement structure and the second protrusion and recess engagement structure should have different configurations.

In the first embodiment, the first junction between the first rotor 10 and the first rotary shaft S1 may be formed into a pentagonal shape, and the second junction between the second rotor 20 and the second rotary shaft S2 may be formed in a quadrilateral shape, as in the second embodiment. Further, as in the third embodiment, the outer diameter of the second rotary shaft S2 may be set to the diameter φs2 that is different from the outer diameter φs1 of the first rotary shaft S1.

In the first embodiment and the third embodiment, the protrusion 10b may be formed in any one of the magnetic steel sheets M11 to M14 which constitute the first rotor 10. Further, the protrusion 20b may be formed in any one of the magnetic steel sheets M22 to M25 which constitute the second rotor 20.

In the first embodiment and the third embodiment, the protrusion 10b may be formed in each of all of the magnetic steel sheets M11 to M15 which constitute the first rotor 10. The number of the protrusions 10b formed on the inner peripheral face of one magnetic steel sheet is not limited to one. For example, five protrusions 10b may be formed on the inner peripheral face of one magnetic steel sheet along the circumferential direction. In this case, if the magnetic steel sheets M11 to M15 are stacked together so as to be angularly shifted from each other, the protrusions 10b are arranged at five positions along the circumferential direction, at the portion of the first rotor 10, to which the first rotary shaft S1 is fitted, as shown in FIG. 6. Thus, it is necessary to form the recessed portions 30 in the portion of the first rotary shaft S1, to which the first rotor 10 is fitted, at five positions corresponding to the five protrusions 10b. On the other hand, if the magnetic steel sheets M11 to M15 are stacked together without being angularly shifted from each other, the protrusions 10b formed in the magnetic steel sheets 11 to M15 may be overlapped with each other at only one position. In this case, it is necessary to form the recessed portion 30 in the first rotary shaft S1 at only one position, and accordingly, the structure of the first rotary shaft S1 is simplified. Similarly, the protrusion 20b may be formed in each of all of the magnetic steel sheets M21 to M25 which constitute the second rotor 20.

In the first embodiment and the third embodiment, a recess may be formed in the first rotor 10, and a protrusion to be engaged in the recess may be formed on the first rotary shaft S1. Further, a recess may be formed in the second rotor 20, and a protrusion to be engaged in the recess may be formed on the second rotary shaft S2.

In the second embodiment, the shape of the first junction between the first rotor 10 and the first rotary shaft S1 may be formed in any appropriate shapes other than a pentagonal shape. Further, the shape of the second junction between the second rotor 20 and the second rotary shaft S2 may be formed in any appropriate shapes other than a quadrilateral shape. That is, when the first junction between the first rotor 10 and the first rotary shaft S1 is formed into a first polygonal shape and the second junction between the second rotor 20 and the second rotary shaft S2 is formed into a second polygonal shape, it is necessary that the number of corners of the first polygonal shape and the number of corners of the second polygonal shape be different from each other.

In the second embodiment, the through-hole 10a of the first rotor 10 may have such sizes that the second rotor shaft S2 can be inserted into the through-hole 10a. Further, the through-hole 20a of the second rotor 20 may have such sizes that the first rotary shaft S1 can be inserted into the through-hole 20a.

In the third embodiment, the outer diameter φs2 of the second rotary shaft S2 may satisfy the following relationship, φr1−L1≤φs2<φs1. That is, it is necessary that the outer diameter φs1 of the first rotary shaft S1 and the outer diameter φs2 of the second rotary shaft S2 be different from each other.

In each of the above-described embodiments, the number of the magnetic steel sheets which constitute each of the rotors 10, 20 may be changed as needed. Further, multiple magnetic steel sheets may be just stacked together without being angularly shifted from each other.

In each of the above-described embodiments, the shaft angle multipliers of the resolvers 1, 2 may be changed as needed.

The invention may be applied not only to a torque sensor including two VR resolvers but also to a torque sensor including two resolvers in which exciting coils are wound on rotors and output coils are wound on stators.

What is claimed is:

1. A torque sensor including a first resolver that outputs a signal corresponding to a rotation angle of a first rotor fitted on an outer periphery of a first rotary shaft, and a second resolver that outputs a signal corresponding to a rotation angle of a second rotor fitted on an outer periphery of a second rotary shaft that is coupled to the first rotary shaft via a torsion bar, the torque sensor detecting a torque exerted on the first rotary shaft or the second rotary shaft based on the signals output from the first resolver and the second resolver, wherein
a first junction between the first rotary shaft and the first rotor and a second junction between the second rotary shaft and the second rotor are formed so as to have different shapes or different sizes.

2. The torque sensor according to claim 1, wherein:
a first protrusion and recess engagement structure that restricts rotation of the first rotor relative to the first rotary shaft is provided in each of the first rotor and the first rotary shaft;
a second protrusion and recess engagement structure that restricts rotation of the second rotor relative to the second rotary shaft is provided in each of the second rotor and the second rotary shaft; and
the first protrusion and recess engagement structure and the second protrusion and recess engagement structure are formed so as to have different shapes or different sizes.

3. The torque sensor according to claim 2, wherein:
each of the first rotor and the second rotor has a structure in which multiple magnetic steel sheets are stacked together so as to be angularly shifted from each other;
a recess or a protrusion included in the first protrusion and recess engagement structure is formed in only one of the multiple magnetic steel sheets that constitute the first rotor; and
a recess or a protrusion included in the second protrusion and recess engagement structure is formed in only one of the multiple magnetic steel sheets that constitute the second rotor.

4. The torque sensor according to claim 3, wherein:
the magnetic steel sheet in which the recess or the protrusion included in the first protrusion and recess engagement structure is formed, is arranged at one end of the first rotor; and
the magnetic steel sheet in which the recess or the protrusion included in the second protrusion and recess engagement structure is formed, is arranged at one end of the second rotor.

5. The torque sensor according to claim 1, wherein:
the first junction is formed in a polygonal shape; and
the second junction is formed in a polygonal shape having corners of which the number differs from the number of corners of the first junction.

6. The torque sensor according to claim 5, wherein:
the number of corners of the first junction corresponds to a value of a shaft angle multiplier of the first resolver; and
the number of corners of the second junction corresponds to a value of a shaft angle multiplier of the second resolver.

7. The torque sensor according to claim 1, wherein:
an outer diameter of a portion of the first rotary shaft, to which the first rotor is fitted, and an outer diameter of a portion of the second rotary shaft, to which the second rotor is fitted, are set to values different from each other;
an inner diameter of the first rotor is set to such a value that the first rotor is able to be fitted onto an outer peripheral face of the first rotary shaft, and an inner diameter of the second rotor is set to such a value that the second rotor is able to be fitted onto an outer peripheral face of the second rotary shaft;
the first junction has a protrusion and recess engagement structure including a first protrusion formed in the first rotor and a first recess formed in the first rotary shaft, to restrict rotation of the first rotor relative to the first rotary shaft;
the second junction has a protrusion and recess engagement structure including a second protrusion formed in the second rotor and a second recess formed in the second rotary shaft, to restrict rotation of the second rotor relative to the second rotary shaft;
the outer diameter of the first rotary shaft is set to be larger than the inner diameter of the second rotor; and
the outer diameter of the second rotary shaft is set to be smaller than a value that is obtained by subtracting a protrusion amount of the first protrusion from the inner diameter of the first rotor.

* * * * *